United States Patent [19]

Roberts et al.

[11] Patent Number: 4,648,038

[45] Date of Patent: Mar. 3, 1987

[54] METHODS AND APPARATUS FOR RESTRUCTURING DEBT OBLIGATIONS

[75] Inventors: Peter A. Roberts; Hamish W. M. Norton, both of New York, N.Y.; John D. Finnerty, Weehawken, N.J.

[73] Assignee: Lazard Freres & Co., New York, N.Y.

[21] Appl. No.: 673,854

[22] Filed: Nov. 21, 1984

[51] Int. Cl.[4] .............................................. G06F 15/30
[52] U.S. Cl. ..................................... 364/408; 364/715; 235/379
[58] Field of Search ............... 364/408, 715, 712, 200, 364/900; 235/379, 380, 383

[56] References Cited

U.S. PATENT DOCUMENTS

| | | | |
|---|---|---|---|
| 3,946,218 | 3/1976 | Rode et al. | 364/715 |
| 4,055,757 | 10/1977 | Tillman et al. | 364/715 |
| 4,194,242 | 3/1980 | Robbins | 237/379 |
| 4,232,367 | 11/1980 | Youden et al. | 364/715 |
| 4,321,672 | 3/1982 | Braun et al. | 237/379 |
| 4,486,849 | 12/1984 | Harigaya et al. | 364/715 |

Primary Examiner—Jerry Smith
Assistant Examiner—Kim Thanh Bui
Attorney, Agent, or Firm—Laurence S. Rogers; Jeffrey H. Ingerman

[57] ABSTRACT

Methods and apparatus for restructuring one or more debt obligations issued in the form of interest-bearing bonds into a serial issue of zero coupon bonds. The data processing system evaluates the cash flows and present value of an existing bond, then creates a serial issue of zero coupon bonds which provides pretax cash flows equivalent to those of the existing bond and determines a table of call yields for the serial issue of zero coupon bonds to replace the table of call prices for the old bond. The system evaluates the after-tax cash flows, and determines the after-tax present value to the issuer of the existing bond and the serial issue of zero coupon bonds. The system periodically determines the potential savings from calling the zero coupon bond issue, or selected bonds from the series, and refinancing the debt at the prevailing interest rates.

4 Claims, 7 Drawing Figures

FIG. 2A

```
                    ( START )
                        │
                        ▼
210 ─ CALCULATE NUMBER OF YEARS BETWEEN
      SETTLEMENT AND MATURITY.
                        │
                        ▼
211 ─ T ← 2 × NUMBER OF YEARS
                        │
                        ▼
212 ─ N ← LEAST INTEGER ≥ T
                        │
                        ▼
213 ─ CR ← COUPON RATE × .005
                        │
                        ▼
214 ─ Y ← MARKET YIELD × .005
                        │
                        ▼
215 ─ CALCULATE PRESENT VALUE OF OLD BOND:
```

$$PV = PR \times CR \times \left[\frac{1}{Y} - \frac{1}{Y(1+Y)^N}\right](1+Y)^{N-T} + PR(1+Y)^{-T}$$

```
                        │
                        ▼
216 ─ CREATE ARRAY NEW BOND WITH DIMENSION
      EQUAL TO NUMBER OF PAYMENTS.
                        │
                        ▼
217 ─ I ← 0
                        │
                        ▼
218 ─ I ← I + 1  ◄──────────┐
                        │       │
                        ▼       │
219 ─ NEW BOND [I] = CR × PR    │
                        │       │
                        ▼       │
                      ╱   ╲     │
220 ─              ╱ I = N ╲ ── NO
                      ╲   ╱
                        │ YES
                        ▼
221 ─ NEW BOND [I] ← NEW BOND [I] + PR
                        │
                        ▼
222 ─ DETERMINE PRESENT VALUE OF NEW BOND
                        │
                        ▼
223 ─ I ← 0
                        │
                        ▼
                      ( TO 2B )
```

METHODS AND APPARATUS FOR RESTRUCTURING DEBT OBLIGATIONS

BACKGROUND OF THE INVENTION

This invention relates to methods and apparatus for restructuring one or more debt obligations issued in the form of interest-bearing bonds, whether in registered form or in bearer form, whether trading at par or above or below par, whether or not the issue has a sinking fund, and whether the issue has a scheduled maturity date or is perpetual, into a serial issue of zero coupon bonds which provides a series of cash payments that is commensurate, on both a discounted basis and on a nondiscounted basis, with the scheduled cash payments of the interest-bearing bond(s). The issuer's obligation to pay interest and obligation to repay principal are referred to collectively as the issuer's "debt payment obligations."

Generally, corporations, municipalities, government agencies, investment trusts, and governments at all levels of sovereignty and jurisdiction issue debt obligations in the form of interest-bearing bonds that have a stated principal amount, maturity date, and schedule of interest payments and principal repayments. Interest is paid at regular intervals to the bondholder, generally semi-annually or annually, based on the principal amount of the bond and the stated interest payment rate. The bond's interest payment rate is also known as the coupon rate of interest. Bonds issued in bearer form have coupons attached to the bond certificate, which are physically detachable. On or after an interest payment date, the bondholder detaches the particular coupon and presents it to the paying agent for payment. A bondholder who chooses to do so can detach coupons from a bearer certificate and sell them separately. In contrast, a bond issued in reqistered form does not have detachable coupons, but is registered in the name of the owner, who receives regular payments of interest from the issuer or his agent.

The principal amount of the bond is repaid to the bondholder on one or more dates that are specified at the time of issue with the final installment payable on the bond's maturity date, which is commonly between one and forty years after the issue date of the bond.

Often, when a borrower issues a bond it retains the option to call the bond for redemption before its scheduled maturity date. This option allows the borrower to terminate its continuing obligation to pay interest at the stated rate if market interest rates drop significantly below the stated interest rate after the call option becomes effective. The dates and prices at which a bond can be called are established when the bond is issued, and published in a schedule of call prices. This call option gives the issuer flexibility in managing and refinancing its outstanding debt.

The yield at which investors are willing to invest money varies over time depending on existing economic conditions and also on conditions forecasted for the future. The yield also varies depending on the length of time for which the investor commits his money, with longer term debt generally bearing higher yields than short term debt.

The conventional method of calculating a bond's yield to maturity, assuming that the coupons are refinanced by the issuer (reinvested by the bondholder) at the same yield, equates the present value of the future stream of debt service payments to the price of the bond. Each future payment is discounted at the same discount rate, rather than in accordance with the particular discount rate, or yield, at which each respective payment would be valued if sold separately to investors. The schedule of yields at which a sequence of separate debt payment obligations would be valued is called the "yield curve" for the issuer's debt. When a borrower calls all or part of a bond issue for redemption, it repurchases all future debt payment obligations associated with the specific bonds called, thus cancelling all remaining coupon interest payments, near term and long term for those bonds. It pays an optional redemption price that corresponds to an optional redemption yield to maturity. Often, this yield is above the prevailing yield curve for near term payments but below the yield curve for long dated payments. The borrower, however, has no ability to call the short term payments and leave the long term payments outstanding. This limits the borrower's flexibility in refinancing its debt to take advantage of changes in market interest rates.

Recently, methods have come into existence to adjust the structure of non-callable interest-bearing bonds to the economic reality of interest yield curves. Referred to as "bond stripping," the method involves either (i) physically detaching the coupons from existing bearer bonds, or (ii) issuing receipts that evidence separate debt payment obligations and marketing the coupons and the remaining corpus, or principal repayment of the bond, or receipts evidencing these, separately. Bond stripping creates a series of zero coupon bonds with each bond corresponding to a separate debt payment obligation of the stripped coupon-bearing bond. This allows short term and long term coupons to be priced at the different yields that correspond to the yield curve for the issuer's debt. Thus the package of debt payment obligations embodied in an interest-bearing bond, which are all valued at the issue's yield to maturity, can be separated and priced individually according to the yield curve and their respective payment dates. These payment obligations are sold in the market to a number of investors who wish to invest money for different lengths of time and who are willing to pay the prices that correspond to the yield curve. By repackaging the stream of debt payment obligations so as to tailor it to the needs of different investors, economic value is created, which accrues to the agent who strips a bond in the form of a differential between the aggregate sale price of the package of separate debt payment obligations and the price of the interest-bearing bond from which the package of separate debt payment obligations was obtained.

To date, however, bond stripping has been limited to U.S. Government bonds because these bonds are non-callable for long periods and are backed by the U.S. Treasury. Callable Treasury bonds have been stripped but the coupons associated with dates beyond the date the Treasury bond first becomes callable have been left attached to the corpus. Corporate, municipal and agency bonds are not stripped because they are callable and subject to default risk. If a callable bond were stripped and then called, the holders of the stripped coupons or interest payment receipts bearing maturity dates later than the call date would lose their investment, and the holer of the corpus of the bond would enjoy a windfall. Such a result is clearly unacceptable and militates against stripping such bonds. In addition, a coupon holder's rights in bankruptcy or default are ill-defined, and this also creates an impediment to coupon stripping of bonds with call risk or default risk.

It is an object of the present invention to provide a method and apparatus for restructuring existing debt obligations to a form which allows the benefits of coupon stripping to be realized, in which the coupon payment obligations and principal repayment obligation(s) can be bought and sold at prices which reflect the respective yields appropriate to their individual maturity dates, and in which the coupon payment obligations associated with dates during the period of callability can also effectively be stripped from the corpus.

It is a more particular object of this invention to provide a method and apparatus for structuring a serial issue of zero coupon bonds to replace one or more existing interest-bearing bonds, either by physically exchanging a newly issued series of zero coupon bonds for the outstanding bonds or by placing the outstanding bonds in trust and issuing a series of zero coupon receipts against the income flow from the trust in a manner that: (a) leaves the issuer's debt payment obligations unchanged, or nearly unchanged, (i) on both a discounted basis and on a nondiscounted basis, and (ii) on a pre-tax basis and on an after-tax basis; and (b) permits the issuer of the new debt payment obligations to call each debt payment obligation separately at the same optional redemption yield to maturity at which the coupon-bearing bond was callable as of the beginning of the applicable call period.

It is a further object of this invention to provide a system for evaluating the newly created serial issue of zero coupon bonds with respect to currently prevailing interest rates in order to assist the issuer in deciding whether it is advantageous to call any of the zero coupon bonds for redemption and, if so, which ones to call.

SUMMARY OF THE INVENTION

These and other objects of the invention are accomplished by providing a data processing system which evaluates the cash flows and present value of an existing bond based on its settlement date, maturity date, coupon rate and yield. The system then creates a serial issue of zero coupon bonds which provides the same pretax cash flows of the existing bond, and evaluates the present value of the new bonds to make certain that it is equivalent to the old bond. The system evaluates the after tax cash flows of both the existing bond and the serial issue of zero coupon bonds, and determines the after tax present value to the issuer of the existing bond and the serial issue of zero coupon bonds, to ensure that the issuer does not suffer any increased tax liability from the serial issue of zero coupon bonds. The system determines a table of call yields for the serial zero coupon bonds to replace the table of call prices for the old bond, so that the effect of calling the entire issue of new bonds is equivalent to the effect of calling the old bond.

After the new serial zero coupon bonds have been issued, the system periodically evaluates the call price of the zero coupon bonds based on the settlement date, maturity date and call yield of the bonds, to inform the issuer of his cost of calling the serial coupon bond issue, in whole or in part.

Further, the system periodically monitors the difference between the call yield for each of the zero coupon bonds and the prevailing market yield indicated from the current interest yield curve, and based on this information determines the potential savings from calling the zero coupon bond issue, or selected bonds from the series, and refinancing the debt at the prevailing interest rates.

Another advantage of the invention is to create securities which will permit a liquid market for the issuer's zero coupon bonds into which the issuer can, in the future, issue additional zero coupon bonds at a lower rate than he would be able to obtain with an initial issue of zero coupon bonds. The rate on the subsequent issue will be lower because a liquid market will already exist.

DETAILED DESCRIPTION OF THE INVENTION

The data processing system for carrying out the invention comprises means for entering the financial data concerning a bond to be analyzed, a processing unit for performing the analysis of the existing bond and generating the structure of the new serial issue of zero coupon bonds and output means to print the new serial issue of zero coupon bonds, the financial data which defines the structure of the new serial issue of zero coupon bonds, including the table of call yields for the bonds and reports which detail the accounting and tax effects of the new bonds. The data entry means also provides the bond issuer access to the system for the purpose of periodically evaluating the serial isssue of zero coupon bonds to determine which, if any, of the bonds can be profitably called for redemption and refinanced. Upon inquiry from the bond issuer, the system prints a report which details the savings or loss from calling each bond and the total potential savings and indicates which of the series of bonds can profitably be called.

With the foregoing overview in mind, the detailed operation of the system can best be understood by reference to FIGS. 1A-4

Figure 1A:
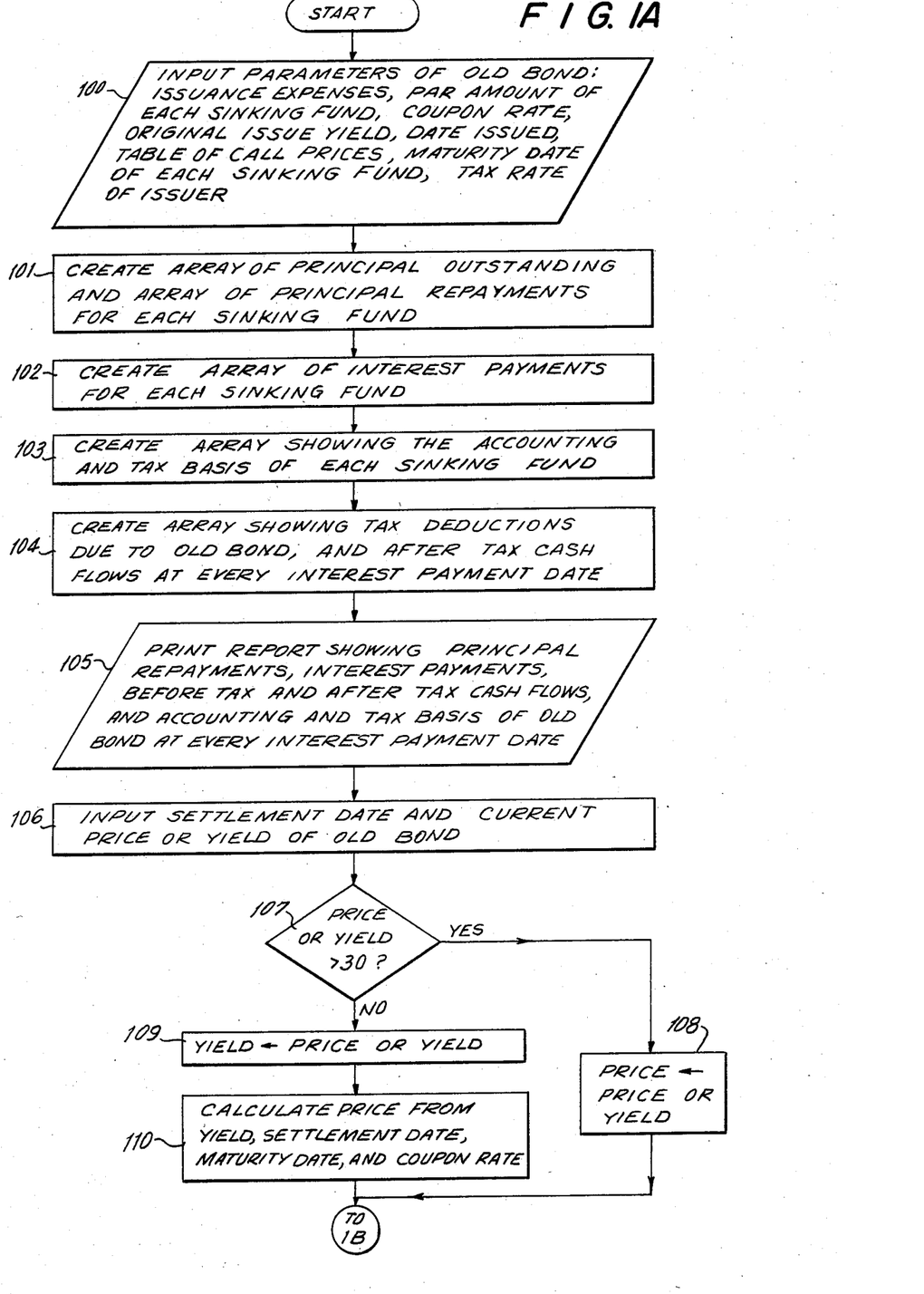
FIGS. 1A and 1B are a schematic flow chart depicting the overall methodology and structure of the data processing system of the invention.
Figure 1B:
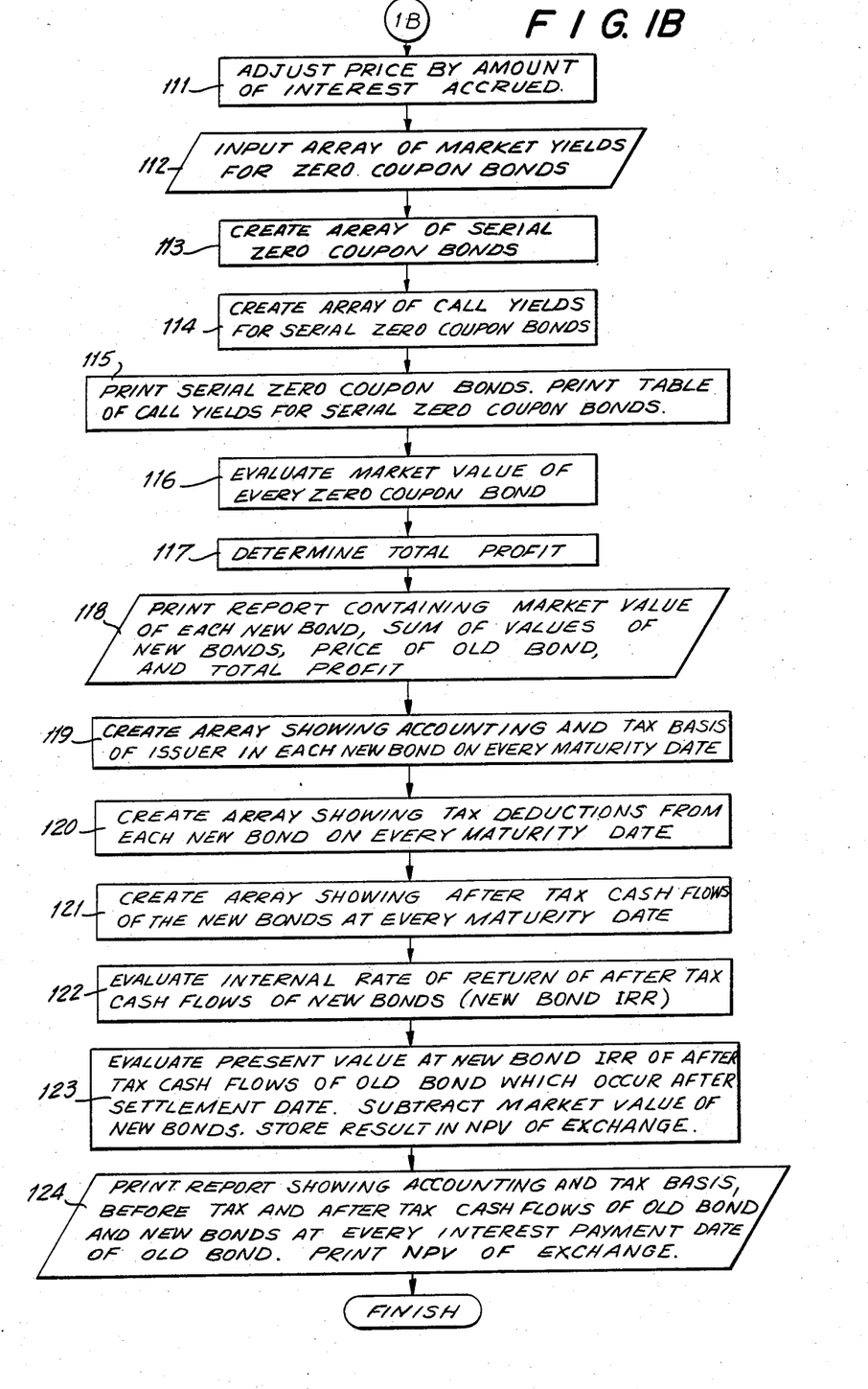

Referring first to FIGS. 1A-1B, data defining the old bond is entered at block 100, including the issue date, coupon rate, original issue yield, table of call prices, par amount of each sinking fund, and the maturity date of each sinking fund. The call prices are entered in reverse chronological order. Data related to the tax accounting for the bond is also entered at block 100, including the issuance expenses and the issuer's tax rate.

Based on this data, the system generates multiple data arrays which show in detail accounting, tax and financial parameters required to create the new serial zero coupon bond issue and to analyze the tax and accounting effects of the new issue. At block 101, an array showing the principal outstanding in each sinking fund at each interest payment date and an array showing the corresponding principal repayments for each sinking fund at each interest payment date are generated. At block 102, an array showing the interest payments for each sinking fund at each interest payment date is generated. At block 103, an array showing the accounting and tax basis of each sinking fund at each interest payment date is generated. At block 104, an array showing the tax deductions and after-tax cash flows at each interest payment date is generated. The tax deductions are based on the interest payment amounts and adjustments for the original issue discount or premium of the bond. From the data arrays generated at block 105, the system prints a report showing, at every interest payment date, the principal repayments, interest payments, before-tax and after-tax cash flows, and the accounting and tax basis of the old bond.

Next, information about the current market is entered at block 106, including the settlement date on which the debt-for-debt exchange will take place and either the current price or the current yield of the old bond. Because generally the issuer will have only one of the current price or current yield, either vaue is accepted. At blocks 107–110, it is determined whether the entered value is the price or the yield, and if necessary the price is determined based on the entered yield value. At block 107, if the entered value is greater than 30, it is determined to be the price, because bond yields have never in recent times exceeded that rate. Flow proceeds to block 108, where the variable price is set to the entered value. Conversely, if the entered value is less than 30 it is determined to be the yield and flow proceeds to block 109, where the variable Yield is set to the entered value, then flow proceeds to block 110 where price is calculated based on the yield, settlement date, maturity date and coupon rate.

From either block 108 or block 110, flow proceeds to block 111, where the price is augmented by the interest accrued between the last interest payment date before the settlement date and the settlement date. The result is the price the issuer would have to pay to buy the old bond at the settlement date.

Next the system proceeds to create the new serial zero coupon issue, to determine the market value of the new issue and to evaluate the potential gain from carrying out the debt-for-debt exchange.

Data defining the prevailing market interest rates for zero coupon bonds of the issuer are entered at block 112 in the form of an array of interest rates, one for each interest payment date of the old bond. The interest rate data are derived from the interest rate yield curve which reflects the yields at which investors are willing to invest money depending on the length of time for which the money is committed.

The new serial issue of zero coupon bonds is created at block 113, be creating an array which defines the principal amount or face value of each individual bond in the series, one zero coupon bond corresponding to each interest payment date of the old bond. A table of call yields for the new serial issue of zero coupon bonds is also generated at block 114. A more detailed explanation of these procedures is given below, with reference to FIGS. 2A, 2B and 3. With the data generated at blocks 113 and 114, which defines the new serial isssue of zero coupon bonds, the bonds and the call yield table can be printed, either by directly connecting the system of the invention to an appropriate printer, or by printing a report which defines the new serial issue of zero coupon bonds and then entering that data in a remote printing system. This is indicated at block 115.

Next, at block 116, the market value of each of the newly created zero coupon bonds is evaluated, based on the market interest rate data entered at block 112. A more detailed explanation of this procedure is given below, with reference to FIG. 4.

At this point the total profit to be realized by making the debt-for-debt exchange by calling the old bond and issuing the new serial issue of zero coupon bonds can be determined. This is accomplished at block 117, where the market values of the individual coupon bonds are summed and that amount is subtracted from the price of the old bond (determined at block 111). The resulting total profit, along with an array of the supporting data including the market price of each of the new zero coupon bonds, the sum of prices of the new bonds and the price of the old bonds, is printed at block 118.

Next, the system makes an evaluation of the accounting and tax basis, the tax consequences, the cash flows and the rate of return of the new bonds, for comparison to those of the old bond. Flow passes to block 119, where the issuer's basis in the old bond as of the settlement date is proportionally allocated among the new zero coupon bonds. The share of the basis of the old bond allocated to each new zero coupon bond is the ratio of the present value of the zero coupon bond to the sum of the present values of all of the new bonds. From the original basis of each of the new zero coupon bonds, an array is created showing, on each maturity date of the new bond series, the issuer's tax basis and accounting basis in each of the new bonds.

Flow then passes to block 120, where an array is created showing the tax deductions from each new bond for each maturity date. The tax deduction for each of the new bonds for each period is based on the accretion in the value of the bond during the period under the scientific interest method. Then flow passes to block 121, where an array is created showing the after-tax cash flows for the new bonds at each maturity date. The after-tax cash flows for the new bonds are determined on the basis of payments made during the year minus applicable tax deductions. At block 122, the internal rate of return (IRR) of the new serial issue of zero coupon bonds is evaluated, based on the after-tax cash flows of the new bonds determined at block 121 and the proceeds from issuing the bonds. The proceeds are deemed to equal the sum of the market vaues of the new bonds on the date of the debt-for-debt exchange.

At block 123, the net present value (NPV) of the debt-for-debt exchange, after taxes, is determined. This is accomplished by evaluating the present value of the after-tax cash flows of the old bond at the after-tax IRR. The same IRR is applied to evaluate the new bonds and the old bonds in order to provide a valid basis for comparison. The market value of the serial issue of zero coupon bonds is subtracted from the present value determined above to give the net present value of the debt-for-debt exchange.

Finally, at block 124, the system prints a summary report which shows, at every interest payment date, and a side-by-side comparison for the old bond and the new zero coupon bonds of the accounting basis, the tax basis and the before-tax and after-tax cash flows and prints the net present value of the exchange.

Figure 2A:
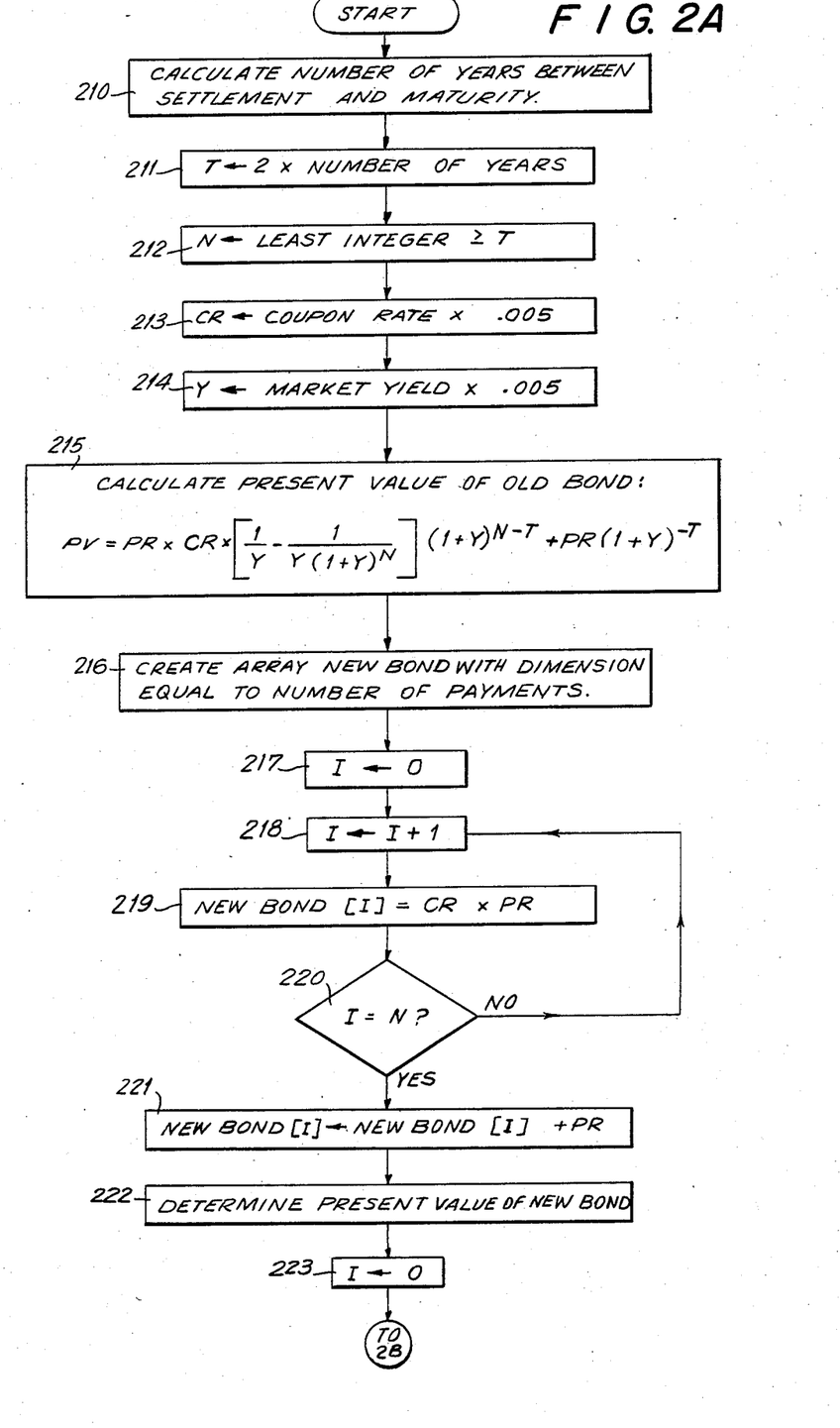
FIGS. 2A and 2B are a schematic flow chart depicting the data processing methodology and structure of that part of the invention which analyzes an existing bond and creates serial zero coupon bonds with commensurate cash flows, yield and present value.
Figure 2B:
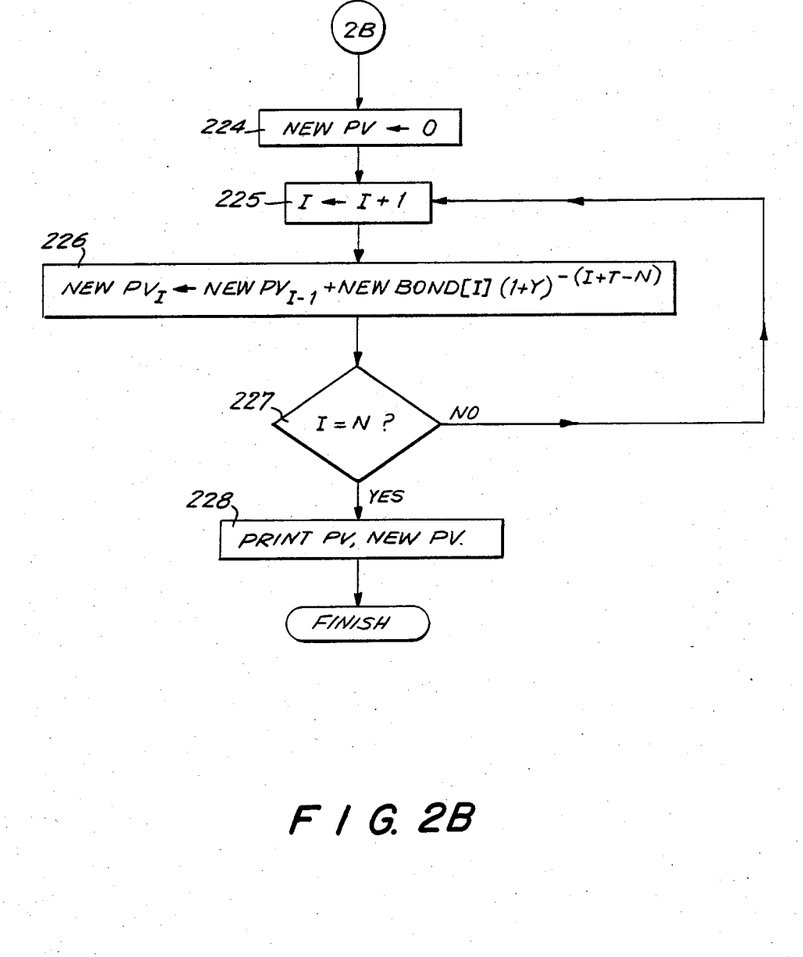

The procedure for defining the face value of each of the new serial issue of coupon bonds is illustrated in more detail in FIGS. 2A and 2B, which correspond to block 113 of FIG. 1B. From an analysis of the financial data which determine the structure of the existing bond, entered at blocks 100 and 107, the system of the invention generates data for defining the structure of the new series of bonds. Based on the settlement date and the maturity date of the old bond, the number of periods remaining and the number of payments remaining are determined at blocks 210, 211 and 212. The coupon rate, customarily expressed as a number representing an annual percentage interest rate, is converted to the proper fractional value for computation based on a semi-annual payment schedule at block 213.

The current market yield to maturity of the old bond is expressed as a number representing an annualized interest rate and converted to fractional form for semi-annual payment periods at block 214.

At block 215, the present value of the old bond is evaluated according to standard bond market practice for discounted present value, using the relationship:

$$PV = PR \times CR \times [Y^{-1} - Y^{-1}(1+Y)^{-N}] \times (-1+Y)^{N-T} + PR \times (1+Y)^{-T}$$

where
PV = present value of the bond
CR = coupon rate of the bond
Y = current yield
N = number of payments remaining before maturity date
T = number of periods remaining before maturity date
PR = par amount of the bond If the interest-bearing bond matures in one lump sum on the maturity date, PR is the par amount of the bond and P is the number of payments remaining through the maturity date. If the interest-bearing bond contains a sinking fund, which requires a series of principal repayments, the present value of the interes-bearing issue can be calculated as the sum of the present values of a series of debt issues, each of which corresponds to one of the principal repayment dates, and at block 215 the above-listed formula is applied to each of these series and the resulting component present values are summed to obtain PV. The present value of the bond is thus equal to the sum of the present value of the stream of coupon payments and the present value of one or more principal repayments.

Blocks 216-221 comprise a loop for creating the face value amounts for each of the new issues of zero coupon bonds (New Bond [I]). The loop creates an array which includes the face value amount for a New Bond for each remaining payment date of the old bond. The face value amount for each issue comprising the new serial issue of zero coupon bonds is calculated at block 219 as:

New Bond [I] = CR × PR

For the last New Bond, the principal amount includes the principal amount of the old bond in addition to the final interest payment as shown in block 221. As before, a sinking fund issue is treated as a serial issue, each maturing on the date of its respective sinking fund payment.

Blocks 222-227 comprise a loop which evaluates the present value of the new serial issue of zero coupon bonds. This is done by summing the present values of all the issues that comprise the series. At block 226, the present value of each new issue in the series is evaluated and added to the sum of the present values of the earlier-dated issues in the series:

New $PV_I$ = New $PV_{I-1}$ + New Bond
[I] × (1+Y)$^{-(I+T-N)}$ where New
PV = the present value of the series of new zero coupon bonds
New Bond [I] = the face value amount of the particular issue of zero bonds corresponding to the $I^{th}$ payment date for the old bond relative to the date of the restructuring.

The present value of the series of new bonds is thus the sum of the present values of the individual issues that comprise the series.

The present value of the old bond and the present value of the new serial issue of zero coupon bonds are printed for comparison at block 228.

This completes the procedure indicated in block 113 of FIG. 1B flow proceeds to block 114. A more detailed explanation of the procedure carried out at block 114 follows, with reference to FIG. 3.

A table of call yields must be determined for the new serial issue of zero coupon bonds. The call yield table must be constructed from the call price table for the existing bond, so that, at any specified date at which the existing bond is first callable at a price listed in the table of call prices, the issuer can call the entire new serial issue of zero coupon bonds for exactly the same total price as it would have paid to call the existing bond on that date. On any other date, the new serial issue of zero coupon bonds may be called at a price which differs from the total price only in the negligible difference between the cost of interest accrued linearly over a fraction of an interest payment period, and the cost of the same interest accrued scientifically, so as to keep the call yield constant.

Figure 3:
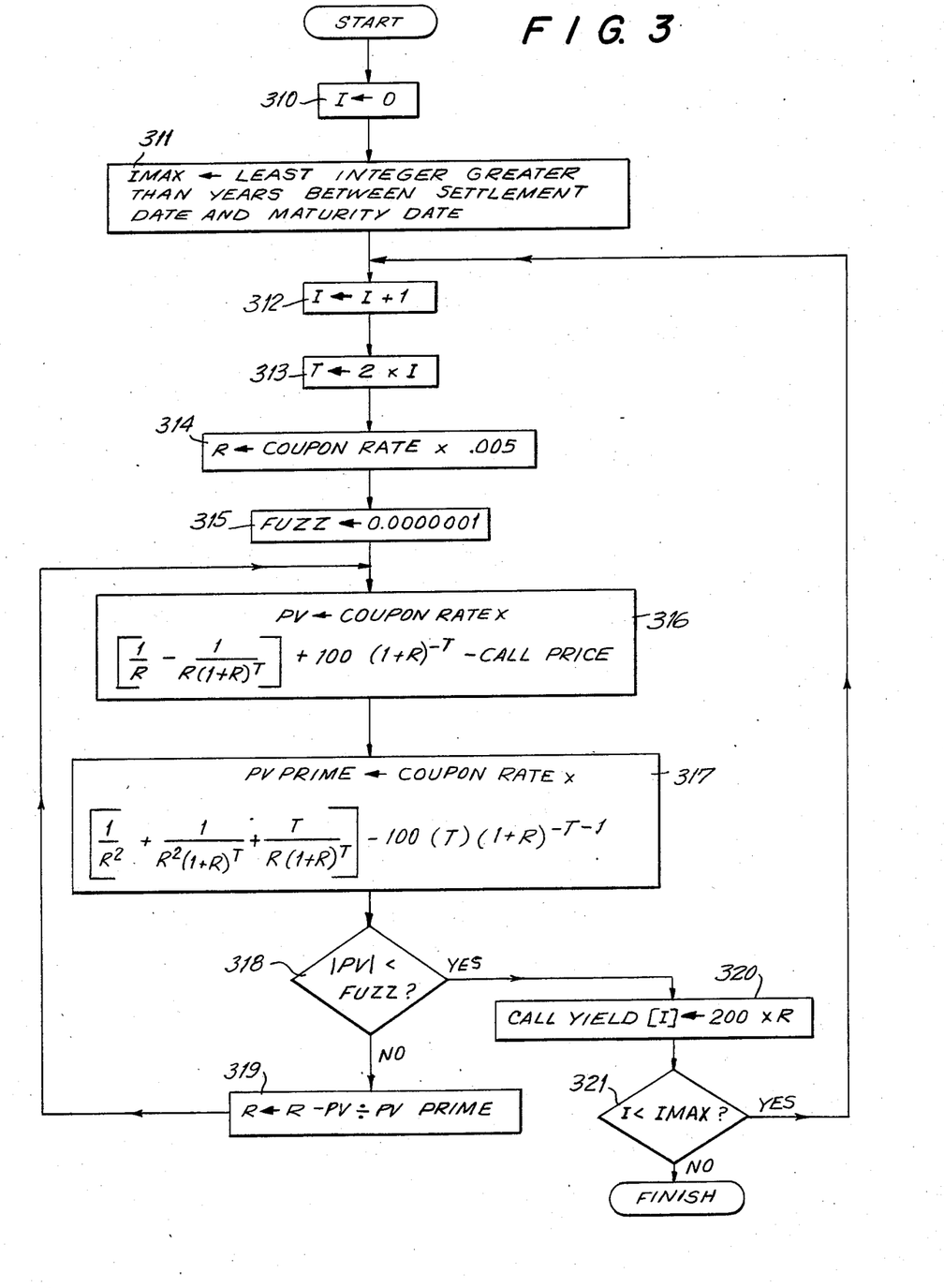
FIG. 3 is a schematic flow chart depicting the data processing methodology and structure of that part of the invention which determines the table of call yields for the new serial issue of zero coupon bonds based on the table of call prices for the existing bond.

As illustrated in FIG. 3, the system determines a call yield table for the new bonds from the call price table established for the old bond. The data from the call price table for the old bond, entered at block 100, which comprises a series of call prices which correspond to a series of established call dates, is the basis for this procedure. The procedure comprises a loop which transforms the series of call prices, one at a time, into a series of equivalent call yields. At block 310, an iteration variable, I, is initialized. At block 311, the variable IMAX is given the value of the number of call dates which remain from the settlement date to the maturity date. At block 312, the variable I is incremented. At block 313, the number of years to maturity for the call price being transformed is expressed as a number of semi-annual periods. The coupon rate of the old bond is expressed in the proper fractional form at block 314 as previously described.

Blocks 315-319 comprise a secondary loop which determines the call yield rate (in fractional form) by a successive approximation method known as the Newton-Raphson method. The call yield rate is the yield to maturity for the bond at the call price. The yield to maturity is that yield which equates the present value of the future interest payments and the principal payment on the bond to the redemption price of the bond or, equivalently, gives a net present value of all cash flows equal to zero when the call price is treated as a negative cash flow.

At block 315, the computational variable FUZZ is set equal to $10^{-7}$. The value of this variable is chosen so that the successive approximation method results in a call yield rate for which the aforementioned net present value is sufficiently close to zero, but terminates in a finite number of iterations.

At block 316, the net present value (PV) for the cash flows of the bond is evaluated at the call yield rate (R) to be tested. As a convenient starting point, R is set equal to the coupon rate (see block 314). Next, at block 317, PV Prime, the derivative of PV as a function of R is evaluated, in effect determining the slope of the Present Value function at the test call yield rate. PV Prime is used, as described below, to choose the next approximation of the call yield rate.

At block 318, the absolute value of PV is tested to determine if it is less than FUZZ, that is, if the resultant net present value at the test call yield rate is approximately zero. If the result is negative, flow passes to block 319 and the iteration loop continues to determine and test another approximation. If the result is positive, flow passes to block 320.

If the iteration continues, the next approximation for the call yield R is determined at block 319. The new test approximation is set equal to $R - PV \div PV$ Prime. Flow then returns to block 316, at which the resultant net present value for the new approximation of call yield is evaluated. Thus the loop continues to refine the approximation of the call yield until a net present value of approximately zero is reached.

As discussed above, when the resultant net present value is approximately zero, the correct call yield has been determined and the iteration loop stops. At block 320, the fractional call yield R is converted to a number which represents an annualized rate. At block 321, I is compared with IMAX to determine whether a call yield has been determined for each call date. If more call dates remain, flow passes to block 312 and the main loop continues. If all call yields have been determined, the loop is completed, the procedure indicated in block 114 is completed, and flow passes to block 115 of FIG. 1B. At block 115 the system prints a table of Call Yields which corresponds to the Call Dates of the old bond.

Figure 4:
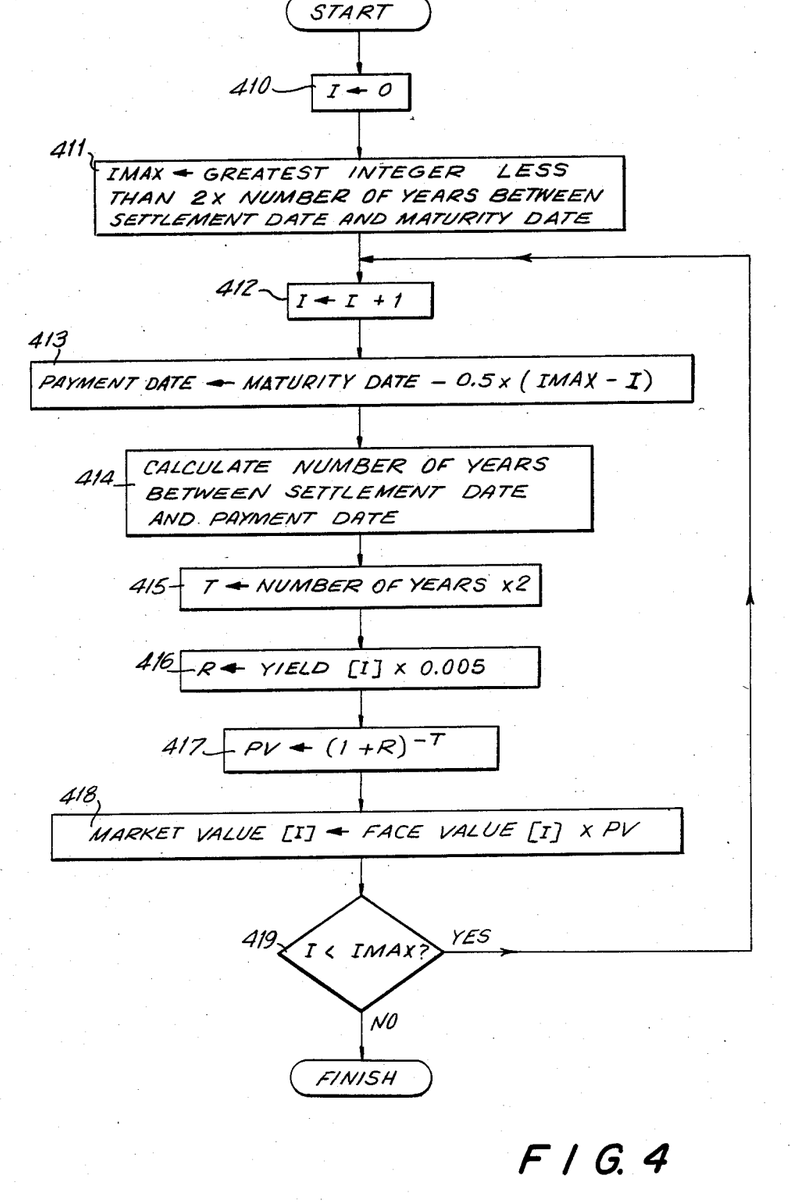
FIG. 4 is a schematic flow chart depicting the data processing methodology and structure of that part of the invention which determines the market value of each of the new zero coupon bonds based on the market yields for the bonds.

FIG. 4 illustrates the procedures for determining the market value of each of the zero coupon bonds, indicated at block 116 of FIG. 1B. The procedure shown in FIG. 4 comprises a loop which determines in each interation the market value of one of the serial issue of zero coupon bonds. At block 410 the iteration variable, I, is initialized. At block 411, the variable IMAX is given the value of the largest integer less than twice the number of years between the settlement date and the maturity date of the last issue in the series of zero coupon bonds. At block 412, the variable I is incremented. The payment date for the zero coupon bond whose market value is to be ascertained is determined at block 413. The number of years between the settlement date and the payment date is calculated at block 414 and this result is expressed as a number of semi-annual periods, T, at block 415. At block 416, the prevailing market yield appropriate for the payment date of the zero coupon bond, Yield [I], is retrieved from the array of market interest rate data entered at block 112, and is converted to a fractional form for semi-annual periods, R.

At block 418, the present value factor, PV, for the zero coupon bond is determined by the relationship $PV = (1+R)^{-T}$. The face value of the bond, Face Value [I], is multiplied by the present value factor to determine the market value of the bond, Market Value [I], at block 418. At block 419, I is compared to IMAX to determine whether the market value of each of the serial zero coupon bonds had been evaluated. If I is less than IMAX, more bonds remain and flow passes to block 412 for another iteration. If I is equal to IMAX, the procedure is completed and flow returns to block 117 of FIG. 1B.

After the new serial issue of zero coupon bonds have issued, the issuer has the option to call them according to the call dates and call yields set out in the call yield table. If the bond issuer decides to call in one or more of the new zero coupon bonds at a particular settlement date, the value of the bonds as of that date, their call price, must be determined. The appropriate call yield can be ascertained from the table of call yields generated as described above.

Because of the nature of the new serial issue of zero coupon bonds, each issue in the series may be called independently, so that the issuer has the flexibility of calling a portion of the serial issue of zero coupon bonds rather than the entire issue. This is equivalent to giving the issuer the fliexbility to call each of the debt payment obligations of the old bond separately. This flexibility, however, makes the call decision more complex because the issuer must decide not only whether to call the bonds at the prevailing market yield but must decide whether it is more desirable to call only a portion of the zero coupon bonds and then select which bonds out of the range of maturity dates should optimally be called.

Figure 5:
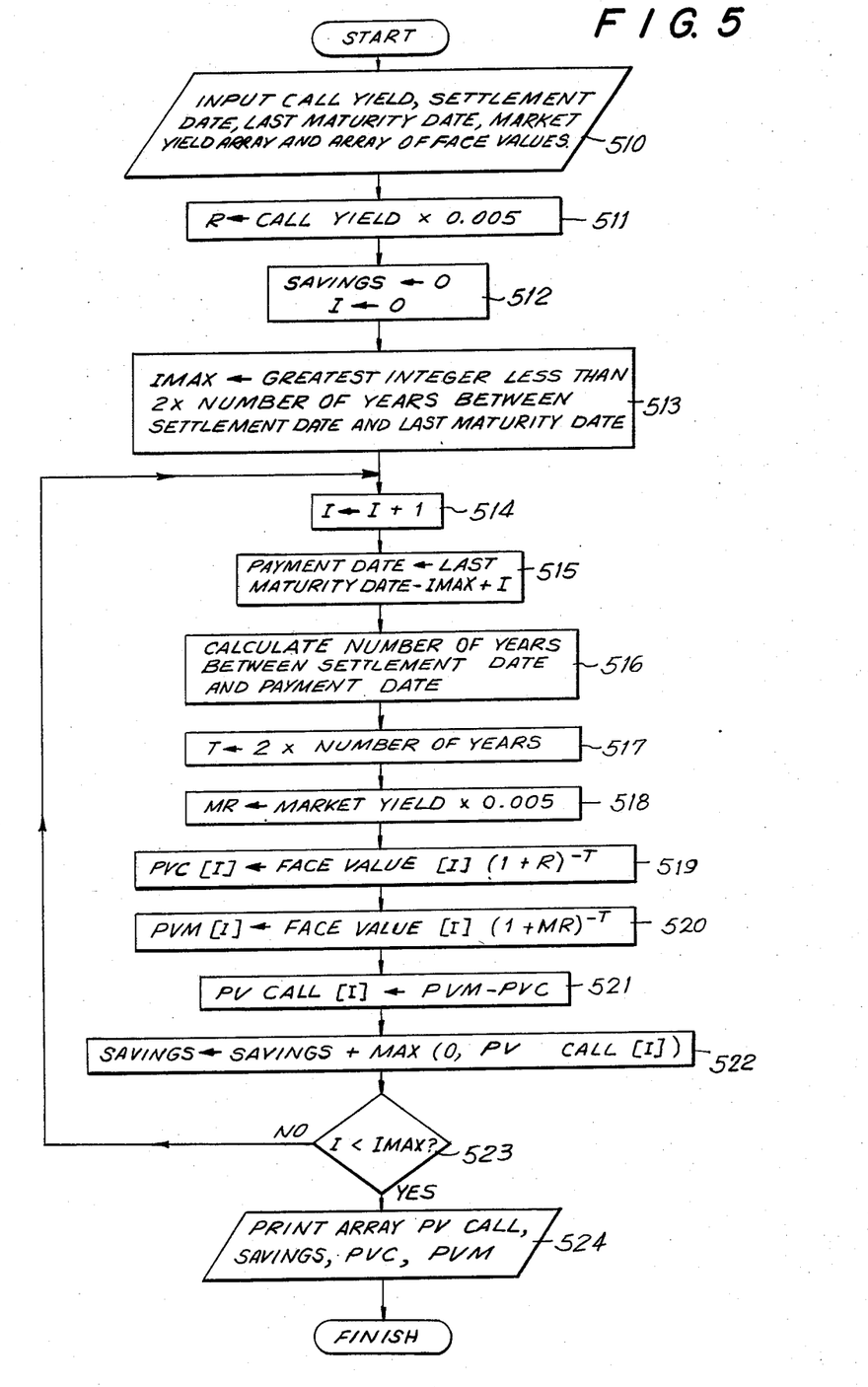
FIG. 5 is a schematic flow chart depicting the data processing methodology and structure of that part of the invention which evaluates the potential savings from calling in the series of zero coupon bonds, or a portion thereof, and refinancing them.

The system provides the issuer with the information necessary to decide whether any issues of the serial issue of zero coupon bonds can profitably be called and to select which of the separate issues should be called. This is accomplished as illustrated in FIG. 5.

The data concerning the refinancing to be analyzed are entered at block 510. These include the refinancing settlement date, the call yield rate determined from the call yield table, the last maturity date and the face values of the serial issues of zero coupon bonds to be evaluated. The annualized call yield rate is converted to a fractional value at block 511. At block 512 the variable Savings, which will take on accumulated savings for the zero coupon bonds to be called, is set to zero, and the iteration variable, I, is initialized. At block 513, the computational variable IMAX is set to the greatest integer less than twice the number of years between the settlement date and the last maturity date.

Blocks 514–523 comprise a loop which evaluates, for each of the zero coupon bonds, the potential savings to be gained by calling the bond for redemption and refinancing the debt at the prevailing interest rate. This evaluation can be done for every zero coupon bond in the series, or for a selection of zero coupon bonds in a range of maturity dates.

At block 514, the iteration variable is incremented. The payment date for the separate zero coupon bond issue to be evaluated is determined at block 515. The number of years between the settlement date and the payment date is calculated at block 516 and this result is expressed as a number of semiannual periods, T, at block 517. At block 518 the prevailing market yield appropriate for the payment date of the particular bond issue being evaluated is converted to a fractional form for semi-annual periods, MR. At block 519 the present value of the separate zero coupon bond at the call yield rate, PVC [I], is evaluated according to the relationship:

$$PVC\ [I] = Face\ Value\ [I] \times (1+R)^{-T}$$

At block 520 the present value of the separate zero coupon bond issue at the prevailing market interest rate, PVM [I], is evaluated according to the relationship:

$$PVM\ [I] = Face\ Value\ [1] \times (1+MR)^{-T}$$

The difference between the present vaue at the call yield rate and the present value at the prevailing market rate represents the cash which can be realized by calling and refinancing the particular zero coupon bond issue evaluated in the current iteration of the loop. If PV Call [I] is positive, the bond being evaluated can be profitably called and refinanced. If PV Call [I] is negative, refinancing would result in an increased debt cost and the bond should not be called. At block 522, PV Call [1] is added to Savings if PV Call [I] is positive and the bond will be called. Otherwise, zero is added because the bond will not be called.

At block 523, I is compared to IMAX to determine whether the savings evaluation has been completed for each of the issues of zero coupon bonds that comprise the series. As long as I is less than IMAX, the test at block 523 is negative, flow returns to block 514, and the evaluation of the next selected zero coupon bond proceeds. If the evaluation has been completed, the test at block 523 is positive, flow is transferred to block 524 and the results of the evaluation of savings are printed, including PVC, PVM and PV Call for each of the issues of zero coupon bonds evaluated, and Savings, the total potential savings to be gained by calling those issues of zero coupon bonds from the new issue of serial zero coupon bonds which can be profitably refinanced.

We claim:

1. A data processing system for implementing a debt-for-debt exchange to restructure an issuer's existing debt issue into a serial issue of callable zero coupon bonds so that debt service payments after the exchange are substantially equivalent to debt service payments prior to the exchange, said existing debt issue and said serial issue of callable zero coupon bonds each having a respective sequence of cash payment obligations, a respective present value, and a respective cost of calling, said exchange occurring on a settlement date, said method comprising:

means for entering parameters which define the existing debt issue, said parameters including a maturity date and a table of call price values;

means for analyzing one or more of said parameters to determine the issuer's cash payment obligations for each of a succession of payment periods from the settlement date of said exchange to the maturity date of the existing debt issue;

means for determining a face value for each maturity of the serial issue of callable zero coupon bonds so that the sequence of cash payment obligations associated with the serial issue of callable zero coupon bonds is substantially equivalent to the sequence of cash payment obligations of said existing debt issue and so that the present value of said serial issue of callable zero coupon bonds equals the present value of said existing debt issue;

means for transforming the table of call price values for the existing debt issue into a table of call yield values for the serial issue of callable zero coupon bonds so that the cost of calling the entire serial issue of callable zero coupon bonds is substantially the same as the cost of calling the existing debt issue at any data on which the existing debt issue can be called; and means for printing certificates evidencing each separate bond issue in the new serial issue of callable zero coupon bonds and for printing the table of call yield values for the new seria issue of callable zero coupon bonds.

2. A data processing method for implementing a debt-for-debt exchange to restructure an issuer's existing debt issue into a serial issue of callable zero coupon bonds so that debt service payments after the exchange are substantialy equivalent to debt service payments prior to the exchange, said existing debt issue and said serial issue of callable zero coupon bonds each having a respective sequence of cash payment obligations, a respective present value, a respective cost of calling, a respective market value, and respective after-tax cash flows, said exchange occurring on a settlement data, said method comprising the steps of:

entering parameters which define the existing debt issue, said parameters including a maturity date and a table of call price values;

analyzing one or more of said parameters to determine the issuer's cash payment obligations for each of a succession of payment periods from the settlement date of said exchange to the maturity date of the existing debt issue;

determining a face value for each maturity of the serial issue of callable zero coupon bonds so that the sequence of case payment obligations associated with the serial issue of callable zero coupon bonds is substantially equivalent to the sequency of cash payment obligations of said existing debt issue and so that the present value of said serial issue of callable zero coupon bonds equals the present value of said existing debt issue;

transforming the table of call price values for the existing debt issue into a table of call yield values for the serial issue of callable zero coupon bonds so that the cost of calling the entire serial issue of callable zero coupon bonds is substantially the same as the cost of calling the existing debt issue at any date on which the existing debt issue can be called; and printing certificates evidencing each separate bond issue in the new serial issue of callable zero coupon bonds and for printing the table of call yield values for the new serial issue of callable zero coupon bonds.

3. The method of claim 2, further comprising;

evaluating the market value of the serial issue of callable zero coupon bonds;

evaluating said after-tax cash flows of the existing debt issue to determine a present value for the after-tax cash flows of the existing debt issue which occur after the settlement date;

calculating a net present value of the debt-for-debt exchange by subtracting said market value from said present value.

4. The method of claim 2, further comprising:

evaluating, for each zero coupon bond in said serial issue of callable zeo coupon bonds, any potential savings to be gained by calling the bond for redemption and refinancing at prevailing interest rates.

* * * * *

UNITED STATES PATENT AND TRADEMARK OFFICE
CERTIFICATE OF CORRECTION

PATENT NO. : 4,648,038

DATED : March 3, 1987

INVENTOR(S) : Peter A. Roberts et al.

It is certified that error appears in the above-identified patent and that said Letters Patent is hereby corrected as shown below:

Column 1, line 37, "reqistered" should be -- registered --.

Column 2, line 65, "holer" should be -- holder --.

Column 5, line 62, "be" should be -- by --.

Column 6, line 54, "vaues" should be -- values --.

Column 7, line 5, after "of" should be inserted -- zero --;

line 8, "lhe" should be -- the --;

line 16, "rale," should be -- rate, --;

lines 27-28, the formula should appear as follows:

$$-- PV = PR \times CR \times [Y^{-1} - Y^{-1}(1+Y)^{-N}] \times (1+Y)^{N-T} + PR \times (1+Y)^{-T} --;$$

line 43, "interes-bearing" should be -- interest-bearing --.

Column 8, line 26, after "1B" should be inserted -- and --.

Column 9, line 51, "inter-" should be --iter- --.

Column 10, line 27, "fliexibility" should be -- flexibility --.

UNITED STATES PATENT AND TRADEMARK OFFICE
CERTIFICATE OF CORRECTION

PATENT NO. : 4,648,038
DATED : March 3, 1987
INVENTOR(S) : Peter A. Roberts et al.

It is certified that error appears in the above-identified patent and that said Letters Patent is hereby corrected as shown below:

Column 11, line 11, the formula should appear as follows:

-- $PVM[I] = \text{Face Value}[I] \times (1+MR)^{-T}$ --;

line 13, "vaue" should be -- value --.

Claim 1, line 35, "data" should be -- date --;

line 40, "seria" should be -- serial --.

Claim 2, line 11, "data," should be -- date, --.

Claim 4, line 3, "zeo" should be -- zero --.

Signed and Sealed this

Fifth Day of January, 1988

Attest:

DONALD J. QUIGG

*Attesting Officer*     *Commissioner of Patents and Trademarks*